US007357903B2

(12) United States Patent
Zhou et al.

(10) Patent No.: US 7,357,903 B2
(45) Date of Patent: Apr. 15, 2008

(54) METHOD FOR REDUCING NOX DURING COMBUSTION OF COAL IN A BURNER

(75) Inventors: Bing Zhou, Cranbury, NJ (US); Sukesh Parasher, Lawrenceville, NJ (US); Jeffrey J. Hare, Provo, UT (US); N. Stanley Harding, North Salt Lake, UT (US); Stephanie E. Black, Sandy, UT (US); Kenneth R. Johnson, Highland, UT (US)

(73) Assignee: Headwaters Heavy Oil, LLC, South Jordan, UT (US)

( * ) Notice: Subject to any disclaimer, the term of this patent is extended or adjusted under 35 U.S.C. 154(b) by 408 days.

(21) Appl. No.: 11/129,833

(22) Filed: May 16, 2005

(65) Prior Publication Data
US 2006/0228282 A1 Oct. 12, 2006

Related U.S. Application Data

(63) Continuation-in-part of application No. 11/104,324, filed on Apr. 12, 2005.

(51) Int. Cl.
*B01D 53/56* (2006.01)
*F23B 99/00* (2006.01)
*F23K 1/00* (2006.01)

(52) U.S. Cl. ............... 423/239.1; 431/4; 431/8; 110/203; 110/218; 110/342; 110/345; 44/605; 44/621

(58) Field of Classification Search ............ 423/239.1; 431/4, 8; 110/203, 218, 342, 345; 44/505, 44/621
See application file for complete search history.

(56) References Cited

U.S. PATENT DOCUMENTS

| | | | |
|---|---|---|---|
| 3,839,225 A | 10/1974 | Acres | ............... 252/432 |
| 3,864,451 A | 2/1975 | Lee et al. | ............... 423/239 |
| 3,885,020 A | 5/1975 | Whelan | ............... 423/245 |
| 3,900,428 A | 8/1975 | Mai et al. | ............... 252/462 |
| 3,925,001 A | 12/1975 | Salooja | ............... 431/4 |
| 3,926,854 A | 12/1975 | Whelan et al. | ............... 252/462 |
| 3,947,380 A | 3/1976 | Whelan et al. | ............... 252/462 |
| 3,976,599 A | 8/1976 | Whelan | ............... 252/462 |
| 3,987,146 A | 10/1976 | Clay et al. | |
| 4,082,837 A | 4/1978 | Whelan | ............... 423/405 |
| 4,088,606 A | 5/1978 | Fedor et al. | ............... 252/465 |
| 4,108,761 A | 8/1978 | Sze et al. | |
| 4,158,044 A | 6/1979 | Takabatake et al. | ........ 423/235 |
| 4,273,749 A | 6/1981 | Kimura et al. | |
| 4,289,737 A | 9/1981 | Acres et al. | ............... 423/245 |
| 4,331,638 A | 5/1982 | Michelfelder | ............... 423/210 |
| 4,366,085 A | 12/1982 | Ikegami et al. | ............... 502/155 |
| 4,374,105 A | 2/1983 | Anderson et al. | |
| 4,375,949 A | 3/1983 | Salooja | |
| 4,397,321 A | 8/1983 | Stuetz | ............... 131/334 |
| 4,433,065 A | 2/1984 | van der Burgt et al. | |
| 4,513,098 A | 4/1985 | Tsao | ............... 502/216 |
| 4,515,092 A | 5/1985 | Walsh et al. | ............... 110/347 |
| 4,581,344 A | 4/1986 | Ledoux et al. | |
| 4,591,430 A | 5/1986 | Hudson | |
| 4,804,388 A | 2/1989 | Kukin | ............... 44/51 |
| 4,824,360 A | 4/1989 | Janka et al. | |
| 4,836,117 A | 6/1989 | Teller et al. | ............... 110/342 |
| 4,842,617 A | 6/1989 | Kukin | ............... 44/51 |
| 4,843,980 A | 7/1989 | Markham et al. | |
| 4,880,378 A | 11/1989 | Hums | |
| 4,966,882 A | 10/1990 | Kato et al. | |
| 5,024,905 A | 6/1991 | Itoh et al. | ............... 429/44 |
| 5,055,029 A | 10/1991 | Avidan et al. | ............... 431/7 |
| 5,087,600 A | 2/1992 | Kato et al. | |
| 5,110,452 A | 5/1992 | Meyer et al. | |
| 5,118,282 A | 6/1992 | Reynolds et al. | ............... 431/4 |
| 5,132,099 A | 7/1992 | Hiramatsu et al. | ............ 423/584 |

(Continued)

FOREIGN PATENT DOCUMENTS

DE 3317504 11/1984

(Continued)

OTHER PUBLICATIONS

Wang, H.P., et al., "Spectroscopic Studies of Coal Maceral Depolymerization Effected by an Iron-Based Catalystl" U.S. Department of Energy 1992, http://www-acerc.byu.edu/Abstracts/19. (1992).

(Continued)

*Primary Examiner*—Timothy C. Vanoy
(74) *Attorney, Agent, or Firm*—Workman Nydegger

(57) ABSTRACT

An organically complexed nanocatalyst composition is applied to or mixed with coal prior to or upon introducing the coal into a coal burner in order to catalyze the removal of coal nitrogen from the coal and its conversion into nitrogen gas prior to combustion of the coal. This process leads to reduced NOx production during coal combustion. The nanocatalyst compositions include a nanoparticle catalyst that is made using a dispersing agent that can bond with the catalyst atoms. The dispersing agent forms stable, dispersed, nano-sized catalyst particles. The catalyst composition can be formed as a stable suspension to facilitate storage, transportation and application of the catalyst nanoparticles to a coal material. The catalyst composition can be applied before or after pulverizing the coal material or it may be injected directly into the coal burner together with pulverized coal.

24 Claims, No Drawings

U.S. PATENT DOCUMENTS

| | | | |
|---|---|---|---|
| 5,176,088 A | 1/1993 | Amrhein et al. | 110/345 |
| 5,211,684 A | 5/1993 | Shannon et al. | 131/352 |
| 5,338,531 A | 8/1994 | Chuang et al. | 423/584 |
| 5,378,443 A | 1/1995 | Engström et al. | |
| 5,384,301 A | 1/1995 | Flytzani-Stephanopoulos et al. | |
| 5,419,286 A | 5/1995 | Edison et al. | 123/1 A |
| 5,516,741 A | 5/1996 | Gascoyne et al. | |
| 5,580,839 A | 12/1996 | Huffman et al. | |
| 5,597,771 A | 1/1997 | Hu et al. | 502/304 |
| 5,612,010 A | 3/1997 | Pandey et al. | |
| 5,662,051 A | 9/1997 | Morin | 110/344 |
| 5,671,758 A | 9/1997 | Rongved | 131/334 |
| 5,705,053 A | 1/1998 | Buchanan | |
| 5,740,667 A | 4/1998 | Bhattacharyya et al. | |
| 5,756,059 A | 5/1998 | Zamansky et al. | 423/239.1 |
| 5,823,758 A | 10/1998 | Lack | 431/4 |
| 5,846,898 A | 12/1998 | Chuang et al. | |
| 5,866,501 A | 2/1999 | Pradhan et al. | |
| 5,871,638 A | 2/1999 | Pradhan et al. | |
| 5,899,678 A | 5/1999 | Thomson et al. | 431/2 |
| 5,925,588 A | 7/1999 | Chuang et al. | |
| 5,936,134 A | 8/1999 | Mastral Lamarca et al. | |
| 5,967,061 A | 10/1999 | Ashworth et al. | 110/203 |
| 6,007,699 A | 12/1999 | Cole | |
| 6,054,507 A | 4/2000 | Funaki et al. | |
| 6,090,858 A | 7/2000 | El-Sayed | |
| 6,127,307 A | 10/2000 | Muller et al. | 502/162 |
| 6,159,267 A | 12/2000 | Hampden-Smith | |
| 6,168,775 B1 | 1/2001 | Zhou et al. | |
| 6,194,338 B1 | 2/2001 | Andolfatto et al. | 502/101 |
| 6,206,685 B1 | 3/2001 | Zamansky et al. | 431/4 |
| 6,280,695 B1 | 8/2001 | Lissianski et al. | |
| 6,401,634 B1 | 6/2002 | Anderson | 110/342 |
| 6,471,506 B1 | 10/2002 | Zamansky et al. | 431/4 |
| 6,494,153 B1 | 12/2002 | Lyon | |
| 6,528,683 B1 | 3/2003 | Heidemann et al. | 562/542 |
| 6,534,661 B1 | 3/2003 | Zhou et al. | |
| 6,551,960 B1 | 4/2003 | Laine et al. | |
| 6,572,761 B2 | 6/2003 | Lyon | |
| 6,612,249 B2 | 9/2003 | Sanders | 110/345 |
| 6,676,919 B1 | 1/2004 | Fischer et al. | |
| 6,706,902 B2 | 3/2004 | Stürmann et al. | 549/523 |
| 6,716,525 B1 | 4/2004 | Yadav et al. | 428/402 |
| 6,740,133 B2 | 5/2004 | Hundley, Jr. | 44/301 |
| 6,740,615 B2 | 5/2004 | Zhou | |
| 6,746,597 B2 | 6/2004 | Zhou et al. | |
| 6,776,606 B2 | 8/2004 | Haskew | 431/2 |
| 6,782,892 B2 | 8/2004 | Li et al. | 131/364 |
| 6,923,945 B2 | 8/2005 | Chen | 423/239.1 |
| 2003/0005622 A1 | 1/2003 | Hundley | 44/443 |
| 2004/0007241 A1 | 1/2004 | Li et al. | 131/334 |
| 2004/0013601 A1 | 1/2004 | Butz et al. | |
| 2004/0037770 A1 | 2/2004 | Fischer et al. | |
| 2004/0168365 A1 | 9/2004 | Hundley | 44/603 |
| 2004/0241502 A1 | 12/2004 | Chung et al. | |
| 2005/0016057 A1 | 1/2005 | Factor et al. | |
| 2005/0108925 A1 | 5/2005 | Jurng et al. | 44/457 |
| 2005/0109356 A1 | 5/2005 | Reddy et al. | 131/334 |
| 2005/0257724 A1 | 11/2005 | Guinther et al. | 110/345 |
| 2006/0117651 A1 | 6/2006 | Hundley | 44/641 |
| 2006/0174902 A1* | 8/2006 | Zhou et al. | 131/352 |

FOREIGN PATENT DOCUMENTS

| | | |
|---|---|---|
| JP | 4-136601 | 5/1992 |
| JP | 4-136602 | 5/1992 |
| WO | WO 98/45037 | 10/1998 |
| WO | WO 02/058825 | 8/2002 |
| WO | WO 02/083550 | 10/2002 |
| WO | WO 03/086115 | 10/2003 |
| WO | WO 2004/110184 | 12/2004 |
| WO | WO 2005/039327 | 5/2005 |
| WO | WO 2005/039328 | 5/2005 |

OTHER PUBLICATIONS

Asami, Kenji, et al., "Highly Active Iron Catalysts from Ferric Chloride for the Steam Gasification of Brown Coal" *American Chemical Society*, Ind. Eng. Chem. Res. 1993, 32, pp. 1631-1636.

Ohtsuka, Yasuo, et al., "Nitrogen Removal During Atmospheric-Pressure Pyrolysis of Brown Coal with Iron" *Fuel*, 1994, vol. 73 No. 7, pp. 1093-1097.

Ahmadi, et al., "Shape-Controlled Synthesis of Colloidal Platinum Nanoparticles" *Science*, vol. 272, pp. 1924-1926 (Jun. 28, 1996).

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective hydrogenation Catalyst" *Chem. Mater.*, vol. 13, pp. 733-737 (Feb. 10, 2001).

Zhou, et al., "Novel Synthesis of Highly Active Pt/C Cathode Electrocatalyst for Direct Methanol Fuel Cell" Chem. Commun. 2003, pp. 394-395.

Zhou, et al. "Preparation and Characterization of Anode Catalysts PtRu/C for Direct Methanol Fuel Cells" Chemical Journal of Chinese Universities, vol. 24, 2003, pp. 885-862.

Ohtsuka, Yasuo, et al., "Selective Conversion of Coal Nitrogen to $N_2$ with Iron," American Chemical Society, Energy & Fuels, vol. 7, (1993) pp. 1095-1096.

Mori, Hiroshi, et al., "Role of Iron Catalyst in Fate of Fuel Nitrogen during Coal Pyrolysis," American Chemical Society, Energy & Fuels, vol. 10, (1996) pp. 1022-1027.

Wu, Zhiheng, et al., "Remarkable Formation of $N_2$ from a Chinese Lignite during Coal Pyrolysis," American Chemical Society, Energy & Fuels, vol. 10, (1996) pp. 1280-1281.

Wu, Zhiheng, et al., "Nitrogen Distribution in a Fixed Bed Pyrolysis of Coals with Different Ranks: Formation and Source of $N_2$," American Chemical Society, Energy & Fuels, 11, (1997) pp. 447-482.

Wu, Zhiheng, et al., "Formation of Nitrogen-Containing Compounds during Slow Pyrolysis and Oxidation of Petroleum Coke," American Chemical Society, Energy & Fuels, vol. 11, (1997) pp. 1073-1080.

Wu, Zhiheng, et al., "Key Factors for Formation of $N_2$ from Low-Rank Coals during Fixed Bed Pyrolysis: Pyrolysis Conditions and Inherent Minerals," American Chemical Society, vol. 11, (1997) pp. 902-908.

Ohtsuka, Yasuo, et al., "Char-Nitrogen Functionality and Interactions between the Nitrogen and Iron in the Iron-Catalyzed Conversion Process of Coal Nitrogen to $N_2$," American Chemical Society, vol. 12, (1998) pp. 1356-1362.

Wu, Zhiheng, et al., "Catalytic Nitrogen Release During a Fixed-Bed Pyrolysis of Model Coals Containing Pyrrolic or Pyridinic Nitrogen," Elsevier, Fuel, vol. 80, (2001) pp. 251-254.

Tsubouchi, Naoto, et al., "Nitrogen Release During High Temperature Pyrolysis of Coals and Catalytic Role of Calcium in $N_2$ Formation," Elsevier, Fuel, vol. 81, (2002) pp. 2335-2342.

Fuel Tech—Fuel Chem® Solutions to Boiler Slagging and Fouling Problems, retrieved from the internet: http://www.fuel-tech.com/fuelchem.htm, Jun. 13, 2005 (copyrighted 1998-2004).

* cited by examiner

METHOD FOR REDUCING NOX DURING COMBUSTION OF COAL IN A BURNER

CROSS-REFERENCE TO RELATED APPLICATION

This application is a continuation-in-part of copending U.S. application Ser. No. 11/104,324, filed Apr. 12, 2005, the disclosure of which is incorporated herein in its entirety.

REFERENCE TO GOVERNMENT CONTRACT

The claimed invention was made with Government support under Contract No. DE-FG26-02NT41618 awarded by the United States Department of Energy. The Government has certain rights in this invention.

BACKGROUND OF THE INVENTION

1. The Field of the Invention

The present invention relates to a method for reducing NOx during combustion of coal, more particularly to a method that utilize an organically complex nanocatalyst applied to or mixed with coal in order to catalyze the release of nitrogen from the coal prior to combustion in a low oxygen zone of a coal burner.

2. Related Technology

Coal combustion is major source of energy for the production of electricity throughout the world. Coal is a good source of energy because of its high energy to weight ratio and its great abundance. The use of coal, however, is increasingly under scrutiny because of environmental concerns. Among the known environmental difficulties with coal combustion is the production and emission of NOx compounds, such as NO, $N_2O$, and $NO_2$. NOx compounds can be very harmful to human health and are known to produce undesirable environmental effects such as smog.

Government regulations require emission from coal burning to be monitored and controlled. Controlling NOx emissions has become increasingly difficult as government regulations continue to lower the allowable level of NOx and other pollutants that can be released into the environment. The requirement for reduced pollutants from coal-fired power plants has led to a demand for suitable new technologies.

In a coal fired power plant, there are two principle sources of NOx formation: fuel NOx and thermal NOx. Fuel NOx is NOx that forms from nitrogen found in the fuel, whereas thermal NOx is formed from other sources of nitrogen such as nitrogen in the air. About 80% of NOx emissions from coal combustion are produced from fuel nitrogen.

One method used to reduce pollutants during coal combustion focuses on removing NOx from power plant flue gas. For example, NOx emitted in flue gas can be removed using selective catalytic reduction (SCR), which converts NOx compounds to nitrogen gas ($N_2$) and water. However, this type of NOx control method is expensive, in part, because of the required capital investment. The cost of these technologies and increasingly stringent government regulations have created a need for less expensive technologies to reduce NOx emissions from coal combustion.

Another method of reducing NOx emissions is to remove coal nitrogen from the coal material by converting it to $N_2$. Recently, researchers have discovered that iron-based catalysts can assist in releasing fuel nitrogen from coal. In work by Ohtsuka and coworkers at Tohoku University (Sendai, Japan), methods have been described for the production of an iron-based catalyst, which, when combined with coal and placed in an pyrolysis environment, causes nitrogen compounds in coal to be released more rapidly, thus causing a decrease in the amount of nitrogen remaining in the char material (Ohtsuka et al., Energy and Fuels 7 (1993) 1095 and Ohtsuka et al., Energy and Fuels 12 (1998) 1356).

Several features of the catalyst and methods used by Ohtsuka make such catalyst and methods too expensive and less effective than desired for use in coal fired power plants. First, Ohtsuka teaches precipitating a $FeCl_3$ solution directly onto the coal using $Ca(OH)_2$. Precipitating the catalyst onto the coal results in intimate contact between the coal and the catalyst precursors and other reagents used to make the catalyst nanoparticles. While Ohtsuka suggests washing the coal to remove chloride and calcium, this step requires washing the entire coal feedstream, which would be very costly on an industrial scale. Furthermore, at least some of these chemicals are likely to be adsorbed by the coal and remain even after washing. Introducing compounds such as chloride and calcium can have an adverse effect on power plant equipment and can cause pollution themselves.

In addition, precipitating the catalyst onto the coal requires that the catalyst be formed in the same location as the coal. This limitation could require that the catalyst be prepared at a coal mine or power plant, or that the coal material be shipped to a separate facility for catalyst preparation, thereby adding to production costs.

Another disadvantage of Ohtsuka's catalyst is that it requires high loading amounts to obtain desired results (e.g., up to 7% by weight of iron). High loading amounts can increase costs and offset the benefits of using a relatively inexpensive material such as iron. In addition, high iron content contributes to ash formation and/or can alter the ash composition.

Therefore, what is needed is an improved method for reducing NOx emissions during coal combustion, particularly a method that employs a catalyst that can more easily be manufactured, shipped, and/or stored, and then added to coal in lesser quantities than existing methods while still producing a desired reduction in NOx emissions.

BRIEF SUMMARY OF THE INVENTION

The present invention provides a method for reducing the output of NOx during coal combustion by increasing the conversion of coal nitrogen (i.e., nitrogen that is bound or fixed within the coal) to nitrogen gas prior to or during combustion. In general, nitrogen that has been fixed within coal can easily oxidize to NOx during coal combustion. Converting a substantial portion of the coal nitrogen to nitrogen gas at least partially prevents or inhibits the formation of NOx from the coal nitrogen. That is because nitrogen gas is highly stable and much more resistant to oxidation during combustion than nitrogen bound in the coal.

The method according to the invention includes applying to or mixing with coal an organically complexed nanocatalyst that is able to catalyze the release of coal nitrogen when the coal and catalyst are initially heated within a coal burner prior to actual combustion. According to one embodiment, the organically complexed nanocatalyst includes iron nanacatalyst particles complexed with a dispersing agent such as glycolic acid or polyacrylic acid.

The organically complexed nanocatalyst may be applied to the coal prior to combustion to yield a pre-combustion coal composition. Alternatively, the organically complexed nanocatalyst may be mixed with the coal after pulverization and prior to injecting the pulverized coal into a coal burner. In yet another embodiment, the organically complexed nanocatalyst is injected into a coal burner together with pulverized coal.

The coal and organically complexed nanacatalyst may be used to reduce NOx in any type of coal burner. According to one embodiment, they may be used in a low NOx burner that includes a specially designed low oxygen pyrolysis zone into which pulverized coal is first introduced in order to convert a portion of the coal nitrogen to nitrogen gas. The organically complexed nanacatalyst further catalyzes this process in order to more efficiently convert coal nitrogen into nitrogen gas, thereby further lowering the overall NOx output during coal combustion.

According to one embodiment, a catalyst complex comprising a plurality of active catalyst atoms complexed with a dispersing agent is formed prior to application to or mixing with coal. The catalyst complex may comprise a solution, colloid, or a suspension of nanoparticles. The active catalyst atoms typically include one or more of titanium (Ti), vanadium (V), chromium (Cr), manganese (Mn), iron (Fe), cobalt (Co), nickel (Ni), copper (Cu), zinc (Zn), Yttrium (Y), zirconium (Zr), niobium (Nb), molybdenum (Mo), tin (Sn), Antimony (Sb), tungsten (W), and osmium (Os). The catalyst atoms may include one or more oxides of the foregoing instead of, or in addition to, ground state catalyst atoms. The dispersing agent typically includes organic molecules that include one or more functional groups selected from the group of a hydroxyl, a carboxyl, a carbonyl, an amine, an amide, a nitrile, an amino acid, a thiol, a sulfonic acid, an acyl halide, a sulfonyl halide, or a nitrogen with a free lone pair of electrons.

According to one embodiment, the catalyst complex comprises a suspension of organically complexed nanocatalyst particles having a size less than about 1 micron as a suspension within a solvent. The nanocatalyst particles within the suspension typically have a concentration greater than about 1% by weight of the suspension, preferably greater than about 5% by weight of the suspension, more preferably greater than about 7.5% by weight, and most preferably greater than about 10% by weight of the suspension.

One advantage of using a suspension of organically complexed nanocatalyst particles is that the nanocatalyst particles are stable such that the suspension can be easily stored and transported without substantial agglomeration of the nanocatalyst particles. This allows the catalyst composition to be prepared, stored, and then transported as needed, thus obviating the need to form the catalyst on-site at the time it is applied to the coal. The catalyst suspension may be applied using simple techniques, such as spraying, which adds negligible to minimal cost to the operation of a coal-fired power plant.

According to another aspect of the invention, a coal composition is provided comprising a coal substrate and a plurality of organically complexed nanocatalyst particles on and/or mixed with said coal substrate. The organically complexed nanocatalyst particles on and/or mixed with the coal substrate have a size less than 1 micron. The nanocatalyst particles are preferably less than about 300 mn in size, more preferably less than about 100 nm, even more preferably less than about 50 nm, and most preferably less than about 10 nm.

Another feature of coal compositions used according to the invention is that the dispersing agent binds to at least a portion of the catalyst atoms and prevents or inhibits agglomeration of the nanocatalyst particles during combustion, pyrolysis, or other high temperature conditions to which the coal compositions may be exposed. Thus, the organically complexed nanocatalyst particles according to the invention have greater stability under extreme temperature conditions compared to conventional metal catalysts. The dispersing agent acts to stabilize the nanocatalyst particles and prevents deactivation. In some cases, the nanocatalyst particles may even be anchored to the coal substrate, thereby preventing or inhibiting sintering or agglomeration of the catalyst particles during pre-combustion processing, and possibly even during at least a portion of the combustion process itself. Preventing agglomeration of the nanocatalyst particles maintains the benefit of nano-sized catalyst particles for longer periods of time compared to conventional catalysts.

The stability of the nanocatalyst particles on the coal material and the efficacy with which the catalyst can assist in converting coal nitrogen to nitrogen gas allows the nanocatalyst composition to be mixed with the coal material in significantly lower concentrations than has been accomplished heretofore using other catalysts. The nanocatalyst composition can be mixed with the coal before or after pulverizing the coal preparatory to combustion. The catalyst complex can be applied to coal using low-cost equipment, such as pumps and sprayers.

In an exemplary embodiment, the nanocatalyst composition is loaded onto the coal material with a catalyst loading of less than about 2.5% by weight of the coal product. In a more preferred embodiment, the catalyst loading is less than about 1.5% by weight. Minimizing catalyst loading significantly reduces the cost of treating the coal and can also reduce the risk of damaging power plant equipment. Minimizing catalyst metal loading can also reduce the risk of adversely affecting commercially valuable byproducts, such as fly ash, produced during coal combustion.

In an exemplary method according to the present invention, a catalyst complex is formed by: (i) providing a plurality of active catalyst atoms; (ii) providing a dispersing agent that includes at least one functional group selected from the group consisting of a hydroxyl, a carboxyl, a carbonyl, an amine, an amide, a nitrile, a nitrogen with a lone pair of electrons, an amino acid, a thiol, a sulfonic acid, sulfonyl halide, and an acyl halide; and (iii) reacting the catalyst atoms and the dispersing agent to form the catalyst complex, which may be in the form of a solution, colloid, or suspension. In one embodiment, the catalyst complex includes a plurality of organically complexed nanocatalyst particles having a size less than 1 micron in suspension within a solvent.

Forming a nanocatalyst suspension from ground state metal atoms instead of a metal salt (e.g., metal chloride or nitrate) can be advantageous because ground state metals are devoid of undesirable anions. A salt form of metal, such as metal chloride or nitrate, can produce a catalyst composition with heteroatoms, such as chloride or nitrate ion, which may need to be removed from the nanocatalyst composition before use. By using a ground state metal as a precursor, use of significant amounts of heteroatoms can be avoided. This feature avoids the expense of subsequent washing of the coal or other fuel and the difficulties of corrosion, fouling, and other side effects of having heteroatoms in the fuel.

Notwithstanding the foregoing, it should be understood that the present invention can be carried out using catalyst complexes formed using metal salts, though this is less preferred. Whether the heteroatoms have an adverse effect can depend on the particular system in which the nanocatalyst composition is used and the particular hetoratoms produced in the catalyst preparation process. In addition, those skilled in the art will recognize that a ground state metal may be oxidized during or after formation of the nanocatalyst particles.

These and other advantages and features of the present invention will become more fully apparent from the following description and appended claims as set forth hereinafter.

DETAILED DESCRIPTION OF THE PREFERRED EMBODIMENTS

I. Introduction

The present invention relates to methods for reducing the output of NOx during coal combustion. This is accomplished, at least in part, by applying or mixing an organically complexed nanocatalyst with coal in order to catalyze the release and conversion of coal nitrogen to nitrogen gas prior to or during combustion. Converting a substantial portion of the coal nitrogen to more stable nitrogen gas at least partially prevents or inhibits the formation of NOx from the coal nitrogen during combustion of the coal.

For purposes of this disclosure, the term "catalyst" does not exclude atoms, molecules, and/or particles that are consumed in a reaction, such as during pyrolysis or combustion of coal within a coal burner. Thus, in some embodiments, the catalysts of the present invention may be consumed by reduction or oxidation during combustion or other high temperature operations.

II. Organically Complexed Catalyst Compositions

Organically complexed nanocatalyst compositions include a catalyst complex formed by reacting one or more active catalyst atoms and a dispersing agent and, optionally, a solvent. The catalyst complex may be in the form of nanocatalyst particles or may be a precursor thereto. The organically complexed nanocatalyst compositions according to the invention may be in the form of a solution, colloid, or suspension when mixed with a solvent, or they may be in the form of a concentrated or dried material upon removal of the solvent. The dried composition can be reconstituted so as to form a solution, colloid, or suspension upon reintroducing one or more solvents into the composition.

A. Catalyst Complexes

Catalyst complexes include one or more different types of active catalyst atoms complexed with one or more different types of dispersing agents. When so complexed, the catalyst atoms are arranged in such a manner that the catalyst atoms either (i) form dispersed nanocatalyst particles in solution or suspension or (ii) that upon contact with a coal substrate and/or after undergoing further processing, the catalyst complexes form dispersed nanocatalyst particles. In either case, the dispersing agent can form a catalyst complex to produce nanoparticles that are dispersed, stable, uniform, and/or desirably sized.

1. Active Catalyst Atoms

The active catalyst atoms useful in practicing the present invention are metal atoms or elements, such as iron or other metals, that can form nanocatalyst particles capable of catalyzing desired reactions during combustion of coal (e.g., the conversion of NOx to non-polluting gases such as $N_2$ during pre-combustion and/or the conversion of CO to $CO_2$ and NO to $N_2$ during combustion). These include elements or groups of elements that exhibit primary catalytic activity, as well as promoters and modifiers.

As the primary active catalyst component, base transition metals are preferred due to their valence characteristics and/or their relatively low cost compared to noble metals and rare earth metals. Examples of base transition metals that exhibit catalytic activity when mixed with coal to reduce coal nitrogen to nitrogen gas in the low oxygen zone of a coal burner include one or more of titanium (Ti), vanadium (V), chromium (Cr), manganese (Mn), iron (Fe), cobalt (Co), nickel (Ni), copper (Cu), zinc (Zn), Yttrium (Y), zirconium (Zr), niobium (Nb), molybdenum (Mo), tin (Sn), Antimony (Sb), tungsten (W), and osmium (Os). The base transition metals may be in a ground state and/or oxide form. The primary catalysts listed above may be used alone or in various combinations with each other or in combination with other elements, such as noble metals, rare earth metals, alkaline metals, alkaline earth metals, or even non-metals, which will typically comprise a minority or the catalyst atoms, if included at all.

In general, the primary active catalyst component will comprise at least about 50% of the active catalyst atoms in the catalyst complex. This percentage measures the actual number of catalyst atoms or their molar ratio. In a preferred embodiment, at least 50% of the active catalyst atoms are iron. Iron is typically preferred as the primary active catalyst because of its low cost and also because of its electron valence characteristics. The iron catalyst atoms may be provided in the form of iron metal, iron chloride, iron sulfate, iron nitrate, iron oxide, or other iron salts. The iron catalyst precursor may either be insoluble in an aqueous medium, as in the case of iron metal, or it may be soluble, as in the case of iron chloride and other iron salts. In a preferred embodiment, iron metal is used in order to avoid incorporating compounds that include the anion of the iron salt.

Optionally, non-transition metals can also be included, typically as promoters or modifiers. Suitable non-transition metals include alkali metals and alkaline earth metals, such as sodium, potassium, magnesium, calcium, etc., and non-metals such as phosphorus, sulfur, and halides.

2. Dispersing Agents

In addition to catalyst atoms, the catalyst complexes include one or more dispersing agents. The dispersing agent is selected to promote the formation of nanocatalyst particles that have a desired stability, size and/or uniformity. Dispersing agents within the scope of the invention include a variety of small organic molecules, polymers and oligomers. The dispersing agent is able to interact and bond with catalyst atoms dissolved or dispersed within an appropriate solvent or carrier through various mechanisms, including ionic bonding, covalent bonding, Van der Waals interaction/bonding, lone pair electron bonding, or hydrogen bonding.

To provide the bonding between the dispersing agent and the catalyst atoms, the dispersing agent includes one or more appropriate functional groups. In one embodiment, the functional group(s) comprise a carbon atom bonded to at least one electron-rich atom that is more electronegative than the carbon atom and that is able to donate one or more electrons so as to form a bond or attraction with a catalyst atom. Preferred dispersing agents include functional groups which have either a charge or one or more lone pairs of electrons that can be used to complex a metal catalyst atom; or which can form other types of bonding such as hydrogen bonding. These functional groups allow the dispersing agent to have a strong binding interaction with the catalyst atoms.

The dispersing agent may be a natural or synthetic compound. In the case where the catalyst atoms are metal and the dispersing agent is an organic compound, the catalyst complex so formed may be an organometallic complex.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such a sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. Typically the molar ratio of dispersing agent functional groups to catalyst atoms is preferably in a range of about 0.001:1 to about 50:1, more preferably in a range of about 0.005:1 to about 10:1, and most preferably in a range of about 0.01:1 to 1:1.

The dispersing agent allows for the formation of very small and uniform nanoparticles. In general, the nanocatalyst particles formed in the presence of the dispersing agent are less than 1 micron in size. In some cases, the nanocatalyst particles may approach the atomic scale. The nanocatalyst particles are preferably less than about 300 nm in size, more preferably less than about 100 nm, even more preferably less than about 50 nm, and most preferably less than about 10 nm.

Finally, depending on the desired stability of the nanocatalyst particles within the coal composition, the dispersing agent can be selected in order to act as an anchor between the nanocatalyst particles and the coal substrate. While the dispersing agent has the ability to inhibit agglomeration of the nanocatalyst particles in the absence of anchoring, chemically bonding the nanocatalyst particles to the coal substrate surface by means of the dispersing agent is an additional and particularly effective mechanism for preventing agglomeration.

During thermal degradation and combustion of the coal composition, the dispersing agent can inhibit deactivation of the nanocatalyst particles. This ability to inhibit deactivation can increase the temperature at which the nanocatalysts can perform and/or increase the useful life of the nanocatalyst in the extreme conditions of combustion, e.g., in a coal burner. Even if including the dispersing agent only preserves catalytic activity for a few additional milliseconds, or even microseconds, the increased duration of the nanocatalyst can be very beneficial at high temperatures, given the dynamics of fuel combustion and pollution formation.

According to one embodiment, the organically complexed nanocatalyst particles may be applied or anchored to a support material apart from the coal substrate. The use of a support material may be advantageous in order to more fully and completely disperse the organically complexed nanocatalyst particles throughout the coal material. The support material may result in a more active nanocatalyst particle by providing more active sites per unit of catalyst material.

B. Solvents and Other Additives

The liquid medium in which the organically complexed nanocatalyst composition is prepared may contain various solvents, including water and organic solvents. Solvents participate in catalyst formation by providing a solution for the interaction of catalyst atoms and dispersing agent. In some cases, the solvent may act as a secondary dispersing agent in combination with a primary dispersing agent that is not acting as a solvent. In one embodiment, the solvent also allows the nanoparticles to form a suspension, as described more fully below. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The selection of a particular solvent is often dictated by cost. While there may in some instances be certain advantages in the use of organic solvents, the cost of either recovering the organic solvent or allowing the organic solvent to be consumed with the catalyst during combustion of the coal may result in a significant economic disadvantage for the use of organic solvents. Therefore, liquids which contain mostly or entirely water are the preferred solvents for the present invention. However, if an organic solvent is used, the solvent can be recovered using known methods such as distillation. Alternatively, if the organic solvent is not recovered, it can provide some fuel value when consumed during coal combustion.

The catalyst composition can also include additives to assist in the formation of the nanocatalyst particles. For example, mineral acids and basic compounds can be added, preferably in small quantities (e.g. less than 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easy separated from the final catalyst solution or suspension using simple techniques such as centrifugation and filtration. Solid materials can also be added to remove unwanted byproducts. For example, activated carbon is a relatively inexpensive material that can be used to remove some unwanted by-products formed during catalyst preparation.

C. Supports and Support Materials

Organically complexed nanocatalyst particles can be isolated on a support surface if desired. In an exemplary embodiment, the nanocatalyst particles are supported by the coal substrate itself. According to one embodiment, the coal substrate may include functional groups to which the dispersing agent can bond.

Alternatively, the organically complexed nanocatalyst particles can be formed on a separate solid support. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports includes carbon-based materials, such as carbon black, activated carbon, graphite, fluoridated carbon, and the like. Other supports include polymers and other inorganic solids, metals, and metal alloys. Organic supports are advantageous in the case where it is desired for the support to burn up with the coal substrate.

In the case where the nanocatalyst particles are attached to a support, they may be deposited within a wide range of loadings on the support material. The loading can range from about 0.01% to about 70 wt % of the supported nanocatalyst particles exclusive of the coal substrate, more preferably in a range of about 0.1% to about 25%. In the case where the support material is porous, it is preferable for the surface area to be at least 20 $m^2/g$, more preferably greater than 50 $m^2/g$.

III. Methods of Making Nanocatalyst Compositions and Particle Suspensions

The process for manufacturing organically complexed nanocatalyst particles can be broadly summarized as follows. First, one or more types of catalyst atoms and one or more types of dispersing agents are selected. Second, the catalyst atoms (e.g., in the form of a ground state metal or metal salt) and dispersing agent (e.g., in the form of a carboxylic acid salt) are reacted or combined together to form a catalyst complex. The catalyst complex is generally formed by first dissolving the catalyst atoms and dispersing agent in an appropriate solvent or carrier and then allowing the catalyst atoms to recombine as the catalyst complex so as to form a solution, colloid, or suspension. The various components may be combined or mixed in any sequence or combination. In addition, a subset of the components can be premixed prior to addition of other components, or all components may be simultaneously combined.

In one embodiment, the catalyst complex may be considered to be the complexed catalyst atoms and dispersing agent, exclusive of the surrounding solvent or carrier. Indeed, it is possible to create a catalyst complex in a solution, a colloid, or a suspension, and then remove the solvent or carrier so as to yield a dried catalyst, complex. The dried catalyst complex can be applied to and/or mixed with a coal substrate in such a form, or can be reconstituted as a solution, colloid, or suspension by adding an appropriate solvent.

In an exemplary embodiment, the components are mixed for a period of about 1 hour to about 5 days. This mixing is typically conducted at temperatures ranging from 0° C. to 200° C. Preferably the temperature does not exceed 100° C. The preparation of the catalyst complex is typically exothermic, so provisions for cooling may be used to control the temperature. The temperature can be held at a constant value throughout the mixing step, or it can be programmed to change during the mixing period.

The preparation of the catalyst complex can evolve hydrogen gas, which can require provisions for handling the gas pressure. Normally, the mixing step will be conducted at or near atmospheric pressure, although elevated pressure may be needed in cases where the mixing is conducted at elevated temperature, especially those exceeding the normal boiling point of the liquid mixture. In one embodiment, an inert gas flow may be provided to safely purge any evolved gases from the mixing apparatus.

According to one currently preferred embodiment, the catalyst atoms used to form nanocatalyst particles comprise iron metal. Using iron metal can be advantageous because iron metal does not form an anion by-product. After mixing with the dispersing agents and optional additives, the iron metal is converted to an active catalyst form and becomes dissolved or suspended in the solvent. Typically the only significant by-product of the catalyst preparation using iron metal is hydrogen gas, which is evolved during the mixing procedure, and which can be a valuable commodity.

In another embodiment, the catalyst atoms are provided as precursors in the form of an iron salt such as iron chloride, iron nitrate, iron sulfate, and the like. These compounds are soluble in an aqueous solvent. However, formation of the catalyst nanoparticles leads to the formation of additional by-products from the release of the anion in the iron salt.

The anion-containing by-product may remain in the catalyst mixture; however, it is usually beneficial to remove the by-product to prevent the heteroatoms from having deleterious effects on equipment used in coal combustion. In the case where the byproduct is in solid form, it may be removed by filtration, centrifugation, or the like. In the case where the byproduct is in liquid form, the byproduct can be removed by distillation, absorption, adsorption, extraction, ion exchange, membrane separation, or In an exemplary embodiment, the nanocatalyst particles are in an active form once the mixing step is complete. In a preferred embodiment, the nanocatalyst particles are formed as a suspension of stable active iron nanocatalyst particles. The stability of the nanocatalyst particles prevents the particles from agglomerating together and maintains them in suspension. Even where some or all of the nanocatalyst particles settle out of suspension over time, the nanocatalyst particles can be easily re-suspended by mixing. The stable suspension is particularly advantageous because it can be shipped, stored, transported, and easily applied to or mixed with a coal substrate.

Because of the strong price pressures on energy production, the cost effective production and application of-the nanocatalyst compositions to a coal substrate may be important in maintaining the economic viability of its use. In one embodiment, the low cost of iron-based precursors, solvent, and dispersing agents are particularly beneficial for minimizing cost.

In one embodiment of the present invention, the concentration of metal catalyst in the suspension may be increased to reduce shipping costs, to more easily apply the catalyst composition to a coal substrate, and/or improve catalyst performance. Typically, the nanocatalyst solution colloid or suspension contains at least about 1% by weight active catalyst atoms. In a preferred embodiment, the final catalyst solution or suspension contains at least about 5% by weight of active catalyst atoms, more preferably at least about 7.5% active catalyst atoms by weight, and most preferably at least about 10% active catalyst atoms by weight. In one embodiment, the nanocatalyst composition is dried and then reconstituted prior to use, as discussed above. The catalyst compositions as described herein provide catalyst nanoparticles that are particularly advantageous for converting coal nitrogen to non-polluting gases such as $N_2$. The effectiveness of the catalyst of the present invention occurs in part because of the small size of the particles, often below 100 nm, the uniform dispersion of the metal catalyst on or within the coal, and the surface structure of the catalyst nanoparticles.

IV. Coal Compositions and Related Methods

Coal compositions useful within the methods of the invention include a coal substrate and at least one type of organically complexed nanocatalyst applied on or mixed with the coal substrate. The organically complexed nanocatalyst compositions can be combined with almost any type of coal material. Suitable coal materials include anthracite, bituminous, subbituminous, and lignite coals. The organically complexed nanocatalyst particles assist in removing and converting coal nitrogen to nitrogen gas prior to combustion in a low oxygen zone of a burner (e.g., within a conventional low NOx burner).

Any method can be used to apply the catalyst composition to the coal material. The complexed nanocatalyst particles can be applied to or mixed with a coal substrate using any desired method, including dipping, spraying, mixing, compacting, etc. Complexed nanocatalyst nanoparticles in the form of a suspension are particularly easy to apply using a spraying technique.

The amount of catalyst applied to coal may be expressed in terms of weight percent of the metal catalyst (e.g., iron) by weight of the overall coal composition. Coal compositions typically include a catalyst metal loading of between about 0.01% and about 10% by weight of the overall coal composition. In a preferred embodiment, the catalyst metal (e.g., iron) loading is preferably less than about 5% by weight of the coal composition, more preferably less than about 2.5% by weight, and most preferably less than about 1.5% by weight.

The complexed nanocatalyst compositions of the invention have sufficient catalytic activity that catalyst loadings can be limited sufficiently to avoid problems with high metal concentrations. For example, high quantities of metal can present potential deposition problems in a boiler due to the fluxing abilities of the metal. The fly ash chemistry can also change with high metal loading. High metal loadings may also have an effect on corrosion of coal combustion equipment. By limiting the metal loading in the coal compositions of the present invention, the risks of these potential problems is reduced.

Coal compositions within the scope of the invention are designed to be used in combination with low NOx burners and over fire air ports. These technologies create a fuel-rich pyrolysis zone within a boiler that provides favorable conditions for the catalytic conversion of fuel nitrogen to harmless nitrogen gas. While not being limited to any particular theory, it is currently believed that the inventive organically complexed nanocatalyst compositions promote the increase of nitrogen release rates within high volatile eastern bituminous coal during the devolatization stage of a low NOx burner. This fuel-rich zone promotes the conversion of fuel nitrogen to nitrogen gas. Once converted to nitrogen gas, the nitrogen becomes more resistant to oxidation to form NOx. Therefore, when the pyrolyzed coal mixture passes into the combustion zone, nitrogen is much less likely to be converted to NOx compounds than the original coal compounds would be. This substantially reduces the overall generation of NOx during coal combustion.

Coal burners are typically designed to burn coal that has been pulverized. Those skilled in the art are readily familiar with coal burners, pulverizers, and related systems used to burn coal. According to one method of the present invention, a catalyst composition as described above is applied directly to the coal prior to pulverization. In this embodiment, applying the catalyst composition to the coal is very simple because the coal can be readily accessed. For example, the catalyst composition can be applied to coal on a conveyer. The nanocatalyst compositions may be applied to coal prior to combustion by "direct injection" or "mixing". In "direct injection", the catalyst is applied to the vertical coal stream located between the pulverizer and the burners. In "mixing", the catalyst is sprayed on the coal as it is conveyed prior to entering the pulverizer.

In an alternative embodiment, the catalyst composition is applied after the pulverizer but before the coal stream reaches the coal burner. Applying the catalyst composition to the coal stream can be somewhat more difficult after pulverization because there is more limited access to the pulverized coal.

In one embodiment, injectors are installed into the tubing of the coal feedstream and the catalyst composition is sprayed into the pulverized coal feed stream. Applying the catalyst composition directly into the pulverized feedstream can be advantageous because the catalyst composition can be better mixed initially since the coal has a small particle size.

In yet another embodiment, the catalyst composition and the pulverized coal material are injected individually into an oxygen depleted portion of a coal burner. In an exemplary embodiment, the catalyst material is sprayed into the burner with the coal material such that the catalyst nanoparticles and the pulverized coal material are sufficiently mixed such that the catalyst nanoparticles can catalyze the removal of coal nitrogen from the coal material within the oxygen depleted portion.

V. Examples of Coal Compositions for Use in Reducting NOx in a Coal Burner

The following are examples of various organically complexed nanocatalyst compositions used to make coal compositions for use in reducing NOx in a coal burner as well as coal compositions that include a coal substrate and an organically complexed nanocatalyst applied thereto. Examples stated in- the past tense are actual examples of catalyst and coal compositions that have been manufactured and/or used according to the invention. Examples recited in present tense are hypothetical examples of catalyst and coal compositions that could be manufactured and/or used according to the invention. Some examples may even include both actual and hypothetical aspects. Even though an example may be hypothetical in nature, or include a hypothetical portion, it should be understood that all examples are based on or extrapolated from actual compositions that have been made and/or tested.

EXAMPLE 1

The following components were combined in a glass jar: 10 g iron metal powder, 3.3 g of a 70 wt. % aqueous solution of glycolic acid, 1.9 g of citric acid, 0.25 g of hydrochloric acid, 0.7 g of nitric acid, and 34.2 g of water. The mixture was placed on a shaker table and agitated for 5 days. At the completion of this process, the iron metal was fully dispersed to yield an organically complexed iron nanocatalyst composition. The mixture was stable and did not settle upon standing for several days.

EXAMPLE 2

The following components were combined in a glass jar: 5 g iron metal powder, 3.3 g of a 70 wt. % aqueous solution of glycolic acid, 1.9 g of citric acid, 0.25 g of hydrochloric acid, and 39.55 g of water. The mixture was placed on a shaker table and agitated for 5 days. At the completion of this process, the iron metal was fully dispersed to yield an organically complexed iron nanocatalyst composition. The mixture was stable and did not settle upon standing for several days.

EXAMPLE 3

The following components were combined in a glass jar: 5.6 g iron metal powder, 33 g of a 70 wt. % aqueous solution of glycolic acid, 19.2 g of citric acid, 55.6 g of a 0.01 wt % aqueous solution of hexachloroplatinic acid, and 200 g of water. The mixture was placed on a shaker table and agitated for 5 days. At the completion of this process, the iron metal was fully dispersed to yield an organically complexed iron-platinum nanocatalyst composition. The mixture was stable and did not settle upon standing for several days.

EXAMPLE 4

The following components were combined in a glass jar: 5 g iron powder, 3.3 g of a 70 wt. % aqueous solution of glycolic acid, 1.9 g of citric acid, 5 g of a 0.01 wt. % aqueous solution of hexachloroplatinic acid, 0.125 g of hydrochloric acid, 0.35 g of nitric acid, and 34.675 g of water. The mixture was placed on a shaker table and agitated for 5 days. At the completion of this process, the iron metal was fully dispersed as an organically complexed iron nanocatalyst composition. The mixture was stable and did not settle upon standing for several days.

EXAMPLE 5

The organically complexed iron nanocatalyst composition of Example 1 was applied to River Hill coal to yield a coal composition according to the invention having an iron catalyst loading of 1.5 wt. %. The coal composition was designed to assist in removing coal nitrogen as nitrogen gas in the low oxygen zone of a coal burner in order to reduce overall NOx production during combustion. In addition, the coal composition may also have superior combustion properties compared to untreated coal (e.g., in terms of possible reductions in CO, hydrocarbons and/or soot).

EXAMPLE 6

The organically complexed iron nanocatalyst composition of Example 2 was applied to River Hill coal to yield a coal composition according to the invention having an iron catalyst loading of 1.5 wt %. The coal composition was designed to assist in removing coal nitrogen as nitrogen gas in the low oxygen zone of a coal burner in order to reduce overall NOx production during combustion. In addition, the coal composition may also have superior combustion properties compared to untreated coal (e.g., in terms of possible reductions in CO, hydrocarbons and/or soot).

EXAMPLE 7

The organically complexed iron-platinum nanocatalyst composition of Example 3 was applied to River Hill coal to yield a coal composition according to the invention having an iron catalyst loading of 1.6 wt %. The coal composition was designed to assist in removing coal nitrogen as nitrogen gas in the low oxygen zone of a coal burner in order to reduce overall NOx production during combustion. In addition, the coal composition may also have superior combustion properties compared to untreated coal (e.g., in terms of possible reductions in CO, hydrocarbons and/or soot).

EXAMPLE 8

The organically complexed iron-platinum nanocatalyst composition of Example 4 was applied to River Hill coal to yield a coal composition according to the invention having an iron catalyst loading of 1.5 wt %. The coal composition was designed to assist in removing coal nitrogen as nitrogen gas in the low oxygen zone of a coal burner in order to reduce overall NOx production during combustion. In addition, the coal composition may also have superior combustion properties compared to untreated coal (e.g., in terms of possible reductions in CO, hydrocarbons and/or soot).

EXAMPLE 9

An organically complexed nanocatalyst composition was made by combining and agitating the following components until the metal was fully dissolved (i.e., there was no settling when agitation was stopped): 26.6 g of Fe(III) citrate, 200 g of water, and 33 g of a 70 wt. % glycolic acid solution. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 10

An organically complexed nanocatalyst composition was made by combining and agitating the following components until the metal was fully dissolved (i.e., there was no settling when agitation was stopped): 5.6 g of iron powder, 300 g of water, and 33 g of a 70 wt. % glycolic acid solution. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 11

An organically complexed nanocatalyst composition was made by combining and agitating the following components until the metal was fully dissolved (i.e., there was no settling when agitation was stopped): 5.6 g of iron powder, 300 g of water, 33 g of a 70 wt. % glycolic acid solution, 19.2 g of citric acid, and 21 g of a 45 wt. % polyacrylic acid solution. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 12

An organically complexed nanocatalyst composition was made by combining and agitating the following components until the metal was fully dissolved (i.e., there was no settling when agitation was stopped): 5.6 g of iron powder, 300 g of water, 19.2 g of citric acid, and 14 g of sodium acetylacetonate. After dissolving, the mixture was heated at 100° C. for 10 minutes. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 13

An organically complexed nanocatalyst composition was made by combining and agitating the following components until the metal was fully dissolved (i.e., there was no settling when agitation was stopped): 5.6 g of iron powder, 200 g of water, 19.2 g of citric acid, and 7.2 g of polyacrylic acid (MW 2020). The complexed iron nanocatalyst composition can be applied to or mixed with a coal substrate to reduce NOx when combusted in a coal burner by removing coal nitrogen as nitrogen gas in the low oxygen zone of the burner.

EXAMPLE 14

An organically complexed nanocatalyst composition was made by combining and agitating the following components until the metal was fully dissolved (i.e., there was no settling when agitation was stopped): 5.6 g of iron powder, 300 g of water, 19.2 g of citric acid, and 21 g of a 45 wt. % sodium polyacrylic acid solution. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 15

An organically complexed nanocatalyst composition was made by combining and agitating the following components until the metal was fully dissolved (i.e., there was no settling when agitation was stopped): 5.6 g of iron powder, 200 g of water, 33 g of a 70 wt. % glycolic acid solution, and 19.2 g of citric acid. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 16

An organically complexed nanocatalyst composition was made by combining and agitating the following components until the metal was fully dissolved (i.e., there was no settling when agitation was stopped): 5.6 g of iron powder, 300 g of water, 33 g of a 70 wt. % glycolic acid solution, and 14 g of sodium acetylacetonate. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 17

An organically complexed nanocatalyst composition was made by combining and agitating the following components until the metal was fully dissolved (i.e., there was no settling when agitation was stopped): 5.6 g of iron powder, 200 g of water, and 111.66 g of EDTA (disodium salt). The complexed iron nanocatalyst composition can be applied to or mixed with a coal substrate to reduce NOx when combusted in a coal burner by removing coal nitrogen as nitrogen gas in the low oxygen zone of the burner.

EXAMPLE 18

An organically complexed nanocatalyst composition was made by combining and agitating the following components until the metal was partially dissolved (i.e., metal did not dissolve completely): 5.6 g of iron powder, 200 g of water, and 37.2 g of EDTA (disodium salt). The complexed iron nanocatalyst composition can be applied to or mixed with a coal substrate to reduce NOx when combusted in a coal burner by removing coal nitrogen as nitrogen gas in the low oxygen zone of the burner.

EXAMPLE 19

An organically complexed nanocatalyst composition was made by combining and agitating the following components until the metal was fully dissolved (i.e., there was no settling when agitation was stopped): 5.6 g of iron powder, 200 g of water, 33 g of a 70 wt. % glycolic acid solution, 19.2 g of citric acid, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 20

An organically complexed nanocatalyst composition was made by combining and agitating the following components until the metal was fully dissolved (i.e., there was no settling when agitation was stopped): 26.6 g of Fe(III) citrate, 200 g of water, 33 g of a 70 wt. % glycolic acid solution, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 21

An organically complexed nanocatalyst composition was made by combining and agitating the following components until the metal was fully dissolved (i.e., there was no settling when agitation was stopped): 200 g of methanol and 35 g of Fe(III) acetylacetate. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 22

An organically complexed nanocatalyst composition was made by combining and agitating the following components until the metal was fully dissolved (i.e., there was no settling when agitation was stopped): 200 g of methanol, 35 g of Fe(III) acetylacetate, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 23

An organically complexed nanocatalyst composition was made by combining and agitating the following components until the metal was partially dissolved (i.e., metal did not dissolve completely): 200 g of water, 19.21 g of citric acid, 5.6 g of iron powder, 55.6 g of aqueous hexachloroplatinic acid (0.01 wt. % platinum), and 3.96 g of dextrose. The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 24

An organically complexed nanocatalyst composition was made by combining and agitating the following components until the metal was partially dissolved (i.e., metal did not dissolve completely): 200 g of water, 19.21 g of citric acid, 5.6 g of iron powder, and 3.96 g of dextrose. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 25

An organically complexed nanocatalyst composition was made by combining and agitating the following components until the metal was partially dissolved (i.e., metal did not dissolve completely): 200 g of water, 5.6 g of iron powder, 19.2 g of citric acid, and 2.8 g of sodium acetylacetonate. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 26

An organically complexed nanocatalyst composition was made by combining and agitating the following components until the metal was fully dissolved (i.e., there was no settling when agitation was stopped): 200 g of water, 5.6 g of iron powder, 19.2 g of citric acid, 2.8 g of sodium acetylacetonate, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 27

An organically complexed nanocatalyst composition was made by combining and agitating the following components until the metal was partially dissolved (i.e., metal did not dissolve completely): 5.6 g of iron powder, 200 g of water, 33 g of a 70 wt. % glycolic acid solution, 19.2 g of citric acid, and 4.2 g of a 45 wt. % aqueous solution of polyacrylic acid. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 28

An organically complexed nanocatalyst composition was made by combining and agitating the following components until the metal was fully dissolved (i.e., there was no settling when agitation was stopped): 5.6 g of iron powder, 200 g of water, 33 g of a 70 wt. % glycolic acid solution, 19.2 g of citric acid, 4.2 g of a 45 wt. % aqueous solution of polyacrylic acid, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 29

An organically complexed nanocatalyst composition was made by combining and agitating the following components until the metal was partially dissolved (i.e., metal did not dissolve completely): 200 g of water, 5.6 g of iron powder, 19.2 g of citric acid, 2.8 g of sodium acetylacetonate, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 30

An organically complexed nanocatalyst composition was made by combining and agitating the following components until the metal was partially dissolved (i.e., metal did not dissolve completely): 5.6 g of iron powder, 200 g of water, 33 g of a 70 wt. % glycolic acid solution, 19.2 g of citric acid, 4.2 g of a 45 wt. % aqueous solution of polyacrylic acid, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 31

An organically complexed nanocatalyst composition was made by combining and agitating the following components until the metal was partially dissolved (i.e., metal did not dissolve completely): 5.6 g of iron powder, 200 g of water, 33 g of a 70 wt. % glycolic acid solution, 19.2 g of citric acid, and 55.6 g of aqueous hexachloroplatinic acid (0.01 wt. % platinum). The complexed iron-platinum nanocatalyst composition can be applied to or mixed with a coal substrate to reduce NOx when combusted in a coal burner by removing coal nitrogen as nitrogen gas in the low oxygen zone of the burner.

EXAMPLE 32

An organically complexed nanocatalyst composition was made by combining and agitating the following components until the metal was fully dissolved (i.e., there was no settling when agitation was stopped): 200 g of water, 5.56 g of iron powder, 4.8 g of citric acid, 33 g of a 70 wt. % glycolic acid solution, and 0.265 g of vanadyl acetylacetonate. The complexed iron-vanadium nanocatalyst composition can be

EXAMPLE 33

An organically complexed nanocatalyst composition was made by combining and agitating the following components until the metal was fully dissolved (i.e., there was no settling when agitation was stopped): 200 g of water, 5.56 g of iron powder, 4.8 g of citric acid, 33 g of a 70 wt. % glycolic acid solution, and 0.2499 g of tungstic acid. The complexed iron-tungsten nanocatalyst composition can be applied to or mixed with a coal substrate to reduce NOx when combusted in a coal burner by removing coal nitrogen as nitrogen gas in the low oxygen zone of the burner.

EXAMPLE 34

An organically complexed nanocatalyst composition was made by combining and agitating the following components until the metal was fully dissolved (i.e., there was no settling when agitation was stopped): 200 g of water, 5.56 g of iron powder, 4.8 g of citric acid, 33 g of a 70 wt. % glycolic acid solution, and 0.1816 g of copper(II) acetate. The complexed iron-copper nanocatalyst composition can be applied to or mixed with a coal substrate to reduce NOx when combusted in a coal burner by removing coal nitrogen as nitrogen gas in the low oxygen zone of the burner.

EXAMPLE 35

An organically complexed nanocatalyst composition was made by combining and agitating the following components until the metal was fully dissolved (i.e., there was no settling when agitation was stopped): 200 g of water, 5.56 g of iron powder, 4.8 g of citric acid, 33 g of a 70 wt. % glycolic acid solution, and 0.190 g of lanthanum hydroxide. The complexed iron-lanthanum nanocatalyst composition can be applied to or mixed with a coal substrate to reduce NOx when combusted in a coal burner by removing coal nitrogen as nitrogen gas in the low oxygen zone of the burner.

EXAMPLE 36

An organically complexed nanocatalyst composition was made by combining and agitating the following components until the metal was fully dissolved (i.e., there was no settling when agitation was stopped): 200 g of water, 5.56 g of iron powder, 4.8 g of citric acid, 33 g of a 70 wt. % glycolic acid solution, and 0.249 g of manganese (II) acetate. The complexed iron-manganese nanocatalyst composition can be applied to or mixed with a coal substrate to reduce NOx when combusted in a coal burner by removing coal nitrogen as nitrogen gas in the low oxygen zone of the burner.

EXAMPLE 37

An organically complexed nanocatalyst composition was made by combining and agitating the following components until the metal was fully dissolved (i.e., there was no settling when agitation was stopped): 200 g of water, 5.56 g of iron powder, 4.8 g of citric acid, 33 g of a 70 wt. % glycolic acid solution, 0.190 g of lanthanum hydroxide, 0.182 g of copper (II) acetate, and 0.245 g of manganese(II) acetate. The complexed iron-lanthanum-copper-manganese nanocatalyst composition can be applied to or mixed with a coal substrate to reduce NOx when combusted in a coal burner by removing coal nitrogen as nitrogen gas in the low oxygen zone of the burner.

EXAMPLE 38

An organically complexed nanocatalyst composition was made by combining and agitating the following components until the metal was fully dissolved (i.e., there was no settling when agitation was stopped): 200 g of water, 5.56 g of iron powder, 4.8 g of citric acid, 33 g of a 70 wt. % glycolic acid solution, 0.25 g of tungstic acid, and 0.265 g of vanadyl acetylacetonate. The complexed iron-tungsten-vanadium nanocatalyst composition can be applied to or mixed with a coal substrate to reduce NOx when combusted in a coal burner by removing coal nitrogen as nitrogen gas in the low oxygen zone of the burner.

EXAMPLE 39

An organically complexed nanocatalyst composition was made by combining and agitating the following components until the metal was fully dissolved (i.e., there was no settling when agitation was stopped): 200 g of water, 5.56 g of iron powder, 4.8 g of citric acid, and 33 g of a 70 wt. % glycolic acid solution. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 40

An organically complexed nanocatalyst composition was made by combining and agitating the following components until the metal was fully dissolved (i.e., there was no settling when agitation was stopped): 10 g of iron powder, 0.25 g aqueous hydrochloric acid (37 wt. %), 3.3 g of a 70 wt. % glycolic acid solution, 1.9 g of citric acid, 34.55 g of water, and 0.35 g aqueous nitric acid (70 wt. %). The complexed iron nanocatalyst composition can be applied to or mixed with a coal substrate to reduce NOx when combusted in a coal burner by removing coal nitrogen as nitrogen gas in the low oxygen zone of the burner.

EXAMPLE 41

An organically complexed nanocatalyst composition was made by combining and agitating the following components until the metal was fully dissolved (i.e., there was no settling when agitation was stopped): 5 g of iron powder, 0.125 g aqueous hydrochloric acid (37 wt. %), 3.3 g of a 70 wt. % glycolic acid solution, 1.9 g of citric acid, 39.675 g of water, and 0.35 g aqueous nitric acid (70 wt. %). The complexed iron nanocatalyst composition can be applied to or mixed with a coal substrate to reduce NOx when combusted in a coal burner by removing coal nitrogen as nitrogen gas in the low oxygen zone of the burner.

EXAMPLE 42

An organically complexed nanocatalyst composition was made by combining and agitating the following components until the metal was fully dissolved (i.e., there was no settling when agitation was stopped): 10 g of iron powder, 0.7 g aqueous nitric acid (70 wt. %), 3.3 g of a 70 wt. % glycolic acid solution, 1.9 g of citric acid, and 34.45 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 43

An organically complexed nanocatalyst composition was made by combining and agitating the following components until the metal was fully dissolved (i.e., there was no settling when agitation was stopped): 5 g of iron powder, 0.525 g aqueous nitric acid (70 wt. %), 3.3 g of a 70 wt. % glycolic acid solution, 1.9 g of citric acid, and 39.625 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 44

An organically complexed nanocatalyst composition was made by combining and agitating the following components until the metal was fully dissolved (i.e., there was no settling when agitation was stopped): 10 g of iron powder, 0.25 g aqueous hydrochloric acid (37 wt. %), 0.7 g aqueous nitric acid (70 wt. %), 3.3 g of a 70 wt. % glycolic acid solution, 1.9 g of citric acid, and 34.20 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 45

An organically complexed nanocatalyst composition was made by combining and agitating the following components until the metal was fully dissolved (i.e., there was no settling when agitation was stopped): 10 g of iron powder, 0.5 g aqueous hydrochloric acid (37 wt. %), 3.3 g of a 70 wt. % glycolic acid solution, 1.9 g of citric acid, and 34.3 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 46

An organically complexed nanocatalyst composition was made by combining and agitating the following components until the metal was fully dissolved (i.e., there was no settling when agitation was stopped): 5 g of iron powder, 0.25 g aqueous hydrochloric acid (37 wt. %), 3.3 g of a 70 wt. % glycolic acid solution, 1.9 g of citric acid, and 39.55 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 47

An organically complexed nanocatalyst composition was made by combining and agitating the following components until the metal was fully dissolved (i.e., there was no settling when agitation was stopped): 10 g of iron powder, 0.7 g aqueous hydrochloric acid (37 wt. %), 3.3 g of a 70 wt. % glycolic acid solution, 1.9 g of citric acid, and 34.1 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 48

An organically complexed nanocatalyst composition was made by combining and agitating the following components until the metal was fully dissolved (i.e., there was no settling when agitation was stopped): 5 g of iron powder, 0.35 g aqueous nitric acid (70 wt. %), 3.3 g of a 70 wt. % glycolic acid solution, 1.9 g of citric acid, and 39.45 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLE 49

An organically complexed nanocatalyst composition was made by combining and agitating the following components until the metal was fully dissolved (i.e., there was no settling when agitation was stopped): 10 g of iron powder, 0.7 g concentrated nitric acid, 0.5 g aqueous hydrochloric acid (37 wt. %), 3.3 g of a 70 wt. % glycolic acid solution, 1.9 g of citric acid, and 33.6 g of water. The complexed iron nanocatalyst composition can be applied to or mixed with a coal substrate to reduce NOx when combusted in a coal burner by removing coal nitrogen as nitrogen gas in the low oxygen zone of the burner.

EXAMPLES 50-87

Examples 50-87 describe a number of organically complexed nanocatalyst compositions that can be applied to or mixed with a coal substrate in order to assist in reducing NOx when combusted in a coal burner by removing coal nitrogen as nitrogen gas in the low oxygen zone of the burner.

The organically complexed nanocatalyst compositions were made according to the following procedure: a metal complexing solution was made by mixing together mineral acid components (i.e., aqueous hydrochloric acid (37%) and/or aqueous nitric acid (70%), dispersing agents (i.e., aqueous glycolic acid (70%) and/or citric acid, and/or ethylene glycol), and 5 wt. % of the de-ionized water in a first container. The remaining de-ionized water was placed into a high shear mixing vessel and the mixer ramped up to 5400 RPM. The iron powder was gradually added to the mixing vessel with continued mixing. The complexing solution was slowly added to the mixing vessel over the course of five minutes to inhibit foaming and rapid temperature increase. Mixing was maintained for 60 hours for each of Examples 50-80 and 86 (4, 2, 2, 6, 6 and 6 hours, respectively, for each of Examples 81-85 and 87), while purging the vessel with nitrogen, to form the organically complexed nanocatalyst compositions.

The components and the amounts of each component measured in grams used to form the organically complexed nanocatalyst compositions of Examples 50-87 are set forth in Table I below:

TABLE I

| Ex-ample | Iron | HCl | HNO₃ | Glycolic Acid | Citric Acid | Ethylene Glycol | Deionized Water |
|---|---|---|---|---|---|---|---|
| 50 | 1500 | 38 | 105 | 165 | 285 | 0 | 5408 |
| 51 | 1500 | 75 | 105 | 165 | 285 | 0 | 5370 |
| 52 | 1500 | 38 | 105 | 165 | 0 | 0 | 5693 |
| 53 | 1500 | 38 | 105 | 0 | 285 | 0 | 5573 |
| 54 | 1500 | 38 | 105 | 660 | 285 | 0 | 4913 |
| 55 | 3000 | 75 | 210 | 495 | 195 | 0 | 3525 |
| 56 | 1500 | 38 | 105 | 54 | 143 | 0 | 5561 |
| 57 | 1500 | 45 | 105 | 0 | 285 | 0 | 5565 |
| 58 | 1500 | 38 | 113 | 0 | 285 | 0 | 5565 |
| 59 | 1500 | 45 | 105 | 108 | 0 | 0 | 5742 |
| 60 | 1500 | 38 | 113 | 108 | 0 | 0 | 5742 |
| 61 | 1500 | 38 | 113 | 54 | 0 | 0 | 5654 |
| 62 | 2250 | 56 | 169 | 0 | 428 | 0 | 4598 |
| 63 | 2250 | 60 | 158 | 0 | 428 | 0 | 4605 |
| 64 | 1500 | 38 | 113 | 81 | 143 | 0 | 5627 |
| 65 | 1500 | 38 | 113 | 54 | 210 | 0 | 5586 |
| 66 | 1500 | 38 | 113 | 0 | 0 | 225 | 5625 |
| 67 | 1500 | 38 | 105 | 0 | 0 | 113 | 5745 |
| 68 | 1500 | 0 | 38 | 0 | 0 | 150 | 5813 |
| 69 | 1500 | 0 | 38 | 8 | 15 | 150 | 5790 |
| 70 | 2250 | 56 | 169 | 162 | 0 | 0 | 4863 |
| 71 | 2250 | 56 | 169 | 81 | 214 | 0 | 4730 |
| 72 | 2250 | 0 | 56 | 2 | 11 | 225 | 4955 |
| 73 | 3000 | 75 | 210 | 0 | 570 | 0 | 3645 |
| 74 | 3750 | 0 | 113 | 0 | 0 | 450 | 3188 |
| 75 | 3750 | 94 | 281 | 270 | 0 | 0 | 3105 |
| 76 | 4500 | 113 | 338 | 162 | 428 | 0 | 3461 |
| 77 | 3200 | 80 | 240 | 230 | 0 | 0 | 4250 |
| 78 | 3200 | 80 | 240 | 115 | 304 | 0 | 4061 |
| 79 | 3200 | 80 | 240 | 0 | 608 | 0 | 3872 |
| 80 | 3600 | 90 | 270 | 259 | 0 | 0 | 4781 |
| 81 | 5100 | 136 | 357 | 0 | 969 | 0 | 10438 |
| 82 | 6400 | 160 | 480 | 0 | 1216 | 0 | 7744 |
| 83 | 6400 | 160 | 480 | 461 | 0 | 0 | 8499 |
| 84 | 8000 | 120 | 360 | 346 | 0 | 0 | 7174 |
| 85 | 6000 | 150 | 450 | 432 | 0 | 0 | 7968 |
| 86 | 3600 | 90 | 270 | 259 | 0 | 0 | 4781 |
| 87 | 6400 | 160 | 480 | 461 | 0 | 0 | 8499 |

EXAMPLES 88-94

Examples 88-94 describe a number of organically complexed nanocatalyst compositions that can be applied to or mixed with a coal substrate in order to assist in reducing NOx when combusted in a coal burner by removing coal nitrogen as nitrogen gas in the low oxygen zone of the burner.

The organically complexed nanocatalyst compositions were made according to the following procedure: a metal complexing solution was made by mixing together mineral acid components (i.e., aqueous hydrochloric acid (37%) and/or aqueous nitric acid 70%)), aqueous glycolic acid (70%), and de-ionized water in a high shear mixer at 100 RPM. A mixture of iron powder and citric acid powder was added to the mixing vessel with continued mixing. Mixing continued between 200 and 4000 RPM, while purging the vessel with nitrogen, to form the organically complexed nanocatalyst compositions.

The components, the amounts of each component measured in weight percent, and the mixing times used to form the organically complexed nanocatalyst compositions of Examples 88-94 were as follows:

TABLE II

| Example | Iron | HCl | HNO₃ | Glycolic Acid | Citric Acid | Deionized Water | Mixing Time |
|---|---|---|---|---|---|---|---|
| 88 | 10 | 0.25 | 0.70 | 6.60 | 3.80 | 78.65 | 99 |
| 89 | 20 | 0.25 | 0.70 | 6.60 | 3.80 | 68.65 | 96 |
| 90 | 20 | 0.25 | 0.70 | 6.60 | 3.80 | 68.65 | 168 |
| 91 | 20 | 0.5 | 1.40 | 6.60 | 3.80 | 67.70 | 125 |
| 92 | 10 | 0.5 | 1.40 | 6.60 | 3.80 | 77.70 | 53 |
| 93 | 20 | 0.5 | 1.40 | 6.60 | 3.80 | 67.70 | 54 |
| 94 | 20 | 0.5 | 1.40 | 6.60 | 3.80 | 67.70 | 32 |

EXAMPLE 95

Any of the foregoing nanocatalyst compositions is modified by substituting or augmenting the iron component with one or more of titanium, vanadium, chromium, manganese cobalt, nickel, copper, zinc, Yttrium, zirconium, niobium, molybdenum, tin, Antimony, tungsten, and osmium, thereby yielding an organically complexed nanocatalyst suitable for application to or mixing with a coal substrate to be burned in a coal burner so as to reduce formation of NOx.

The following examples show results from a bench-scale pre-combustion test that was performed in order to preliminarily test the concept that applying or mixing an organically complexed nanocatalyst composition with coal would assist in the removal of coal nitrogen in a low oxygen zone of a conventional coal burner. The examples demonstrate that complexed nanocatalysts according to the invention were useful in increasing coal nitrogen removal at high temperature and low oxygen relative to untreated coal.

The pre-combustion test apparatus was a LECO TGA-601 analyzer, which included four major parts: 1) a coal feeder, 2) a combustion chamber, 3) an electric furnace, and 4) off gas analyzers. The combustion chamber utilized a ceramic vessel that fit inside a protective outer stainless steel chamber to act as a liner to eliminate the catalytic effects of stainless steel. Sweep gas, made up of air and argon, was metered and swept past the end of a coal auger from which coal entered the gas mixture. The mixture of coal, air and argon were then dropped into the ceramic combustion chamber located inside the electric furnace. A thermocouple inserted into the ceramic chamber recorded the temperature.

As the mixture of air, argon and coal entered the heated combustion chamber, the coal ignited. As the coal devolatilized, the heavier ash particles fell to the bottom of the chamber and were collected after the experiment ended. The off gases, with any entrained ash particles, passed from the ceramic chamber to a particulate trap to remove the ash material. The clean gases flowed through a series of moisture traps designed to remove any water vapors and tars. After removing these substances, the gas flowed to a gas analyzer to measure NOx.

EXAMPLES 96-99

Examples 96-99 show the results of the pre-combustion study relative to the organically complexed nanocatalyst compositions of Examples 1-4, which were used to make the coal compositions of Examples 5-8. The catalyst compositions of Examples 1-4 were applied to coal in pulverized form to form the coal compositions of Examples 5-8.

Approximately 2.5 grams of a pulverized coal/catalyst mixture made using the nanocatalyst compositions of Examples 1-4 were loaded into the LECO TGA-601 apparatus and heated to 107° C. for 30 minutes in an argon environment. The apparatus was programmed to ramp at 43° C. per minute up to 950° C. and then hold that temperature for 60 minutes, all in an argon environment. After subsequent cooling, the coal char samples were recovered from the apparatus and analyzed in a CHN analyzer. This allows the percentage of coal nitrogen released during pyrolysis to be determined.

COMPARATIVE EXAMPLE 1

In order to provide a baseline from which to analyze the effect of applying an organically complexed nanocatalyst material to coal (i.e., River Hill coal), untreated River Hill coal (a Pittsburgh 8 bituminous coal) was tested using the LECO TGA-601 analyzer according to the method described above. CHN analysis of the coal char material indicated that 30.67% of the coal nitrogen was released to gaseous products.

EXAMPLE 96

The coal composition of Example 5 was tested using the LECO TGA-601 analyzer according to the method described above. CHN analysis of the coal char indicated that 41.2% of the coal nitrogen was released to gaseous products. This is an increase in nitrogen release of 34.3% relative to Comparative Example 1.

EXAMPLE 97

The coal composition of Example 6 was tested using the LECO TGA-601 analyzer according to the method described above. CHN analysis of the coal char indicated that 42.6% of the coal nitrogen was released to gaseous products. This is an increase in nitrogen release of 38.9% relative to Comparative Example 1.

EXAMPLE 98

The coal composition of Example 7 was tested using the LECO TGA-601 analyzer according to the method described above. CHN analysis of the char indicated that 44.1% of the coal nitrogen was released to gaseous products. This is an increase in nitrogen release of 43.8% relative to Comparative Example 1.

EXAMPLE 99

The coal composition of Example 8 was tested using the LECO TGA-601 analyzer according to the method described above. CHN analysis of the coal char indicated that 43.2% of the coal nitrogen was released to gaseous products. This is an increase in nitrogen release of 40.8% relative to Comparative Example 1.

The results of the pre-combustion test indicate that the four nanocatalyst compositions described in Examples 96-99 were effective in substantially increasing the release of coal nitrogen from coal in a low oxygen pre-combustion setting. This suggests that coal treated using such nanocatalyst compositions would be expected to increase the release of coal nitrogen within the low oxygen, pre-combustion zone of a coal burner.

Even though most of the exemplary organically complexed nanocatalyst compositions set forth in the examples were not rigorously tested to determine if they would definitively work to reduce NOx production during coal combustion in a coal burner, one of skill in the art will readily understand that many, if not most, of such compositions might be expected to work in this manner. Moreover, many, if not all, of the exemplary catalyst compositions would be expected to enhance at least some aspect of combustion of coal (e.g., in increasing combustion efficiency in order to reduce the amount of CO, hydrocarbons and/or soot that is produced during combustion of a nanocatalyst treated coal composition).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of reducing NOx during combustion of coal within a burner, comprising,
providing a coal substrate;
providing an organically complexed nanocatalyst composition, the nanocatalyst composition comprising,
a plurality of catalyst nanoparticles having a size less than about 1 micron and including at least one type of metal; and
a dispersing agent comprising a plurality of organic molecules, each having at least one functional group capable of bonding to at least one metal atom of the catalyst nanoparticles;
introducing the coal substrate and the organically complexed nanocatalyst composition into a coal burner; and
causing or allowing the catalyst nanoparticles to catalyze one or more reactions that reduce the amount of NOx produced during combustion of the coal substrate.

2. A method as defined in claim 1, the organically complexed nanocatalyst composition being applied to and/or mixed with the coal substrate prior to being introduced into the coal burner.

3. A method as defined in claim 2, the organically complexed nanocatalyst composition being applied to the coal substrate prior to pulverization.

4. A method as defined in claim 2, the organically complexed nanocatalyst composition being applied to and/or mixed with the coal substrate subsequent to pulverization.

5. A method as defined in claim 1, the organically complexed nanocatalyst composition being injected into the coal burner together with the coal substrate in pulverized form.

6. A method as defined in claim 1, at least a portion of the organically complexed nanocatalyst composition forming a bond with the coal substrate prior to being introduced into the coal burner.

7. A method as defined in claim 1, the coal substrate and organically complexed nanocatalyst composition being introduced into a low oxygen zone of a coal burner.

8. A method as defined in claim 1, the coal burner being a low NOx burner.

9. A method as defined in claim 1, the coal substrate comprising at least one member selected from the group consisting of anthracite coal, bituminous coal, subbituminous coal, and lignite coal.

10. A method as defined in claim 1, the metal within the catalyst nanoparticles comprising at least one member selected from the group consisting of titanium (Ti), vanadium (V), chromium (Cr), manganese (Mn), iron (Fe), cobalt (Co), nickel (Ni), copper (Cu), zinc (Zn), Yttrium (Y), zirconium (Zr), niobium (Nb), molybdenum (Mo), tin (Sn), Antimony (Sb), tungsten (W), osmium (Os), and oxides of the foregoing.

11. A method as defined in claim 10, the catalyst nanoparticles further comprising at least one member selected from the group consisting of noble metals, rare earth metals, alkaline metals, alkaline earth metals, and non-metals.

12. A method as defined in claim 1, the functional group capable of bonding to at least one metal atom comprising at least one member selected from the group consisting of a hydroxyl, a carboxyl, a carbonyl, an amine, an amide, a nitrile, a nitrogen having a free lone pair of electrons, an amino acid, a thiol, a sulfonic acid, a sulfonyl halide, and an acyl halide.

13. A method as defined in claim 1, the dispersing agent comprising at least one member selected from the group consisting of alcohols, dialcohols, carboxylic acids, dicarboxylic acids, hydroxy acids, sugars, polyfunctional carboxylic acids, amino acids, sulfonic acids, and silicon-based compounds.

14. A method as defined in claim 1, the dispersing agent comprising at least one member selected from the group consisting of ethanol, propanol, formic acid, acetic acid, oxalic acid, malic acid, malonic acid, maleic acid, succinic acid, ethylene glycol, propylene glycol, 1,3-propanediol, glycolic acid, lactic acid, glucose, citric acid, pectins, cellulose, ethanolamine, mercaptoethanol, 2-mercaptoacetate, glycine, sulfobenzyl alcohol, sulfobenzoic acid, sulfobenzyl thiol, and sulfobenzyl amine.

15. A method as defined in claim 1, the catalyst nanoparticles having a size less than about 300 nm.

16. A method as defined in claim 1, the catalyst nanoparticles having a size less than about 50 nm.

17. A method as defined in claim 1, the catalyst nanoparticles having a size less than about 10 nm.

18. A method as defined in claim 1, the catalyst nanoparticles being provided in an amount in a range of about 0.01% to about 10% by combined weight of the coal substrate and the organically complexed nanocatalyst composition.

19. A method of reducing NOx during combustion of coal within a burner, comprising,
providing a coal substrate;
applying an organically complexed nanocatalyst composition to the coal substrate to form a coal composition, the nanocatalyst composition comprising,
a plurality of catalyst nanoparticles having a size less than about 1 micron and including at least one type of metal; and
a dispersing agent comprising a plurality of organic molecules, each having at least one functional group capable of bonding to at least one metal atom of the catalyst nanoparticles;
pulverizing the coal composition to form a pulverized coal composition that includes pulverized coal and the catalyst nanoparticles;
introducing the pulverized coal composition into a coal burner; and
causing or allowing the catalyst nanoparticles to catalyze one or more reactions that reduce the amount of NOx produced during combustion of the coal substrate.

20. A method as defined in claim 19, the coal composition having a catalyst loading of less than about 5% by weight of the coal composition.

21. A method as defined in claim 19, the coal composition having a catalyst loading of less than about 2.5% by weight of the coal composition.

22. A method as defined in claim 19, the coal composition having a catalyst loading of less than about 1.5% by weight of the coal composition.

23. A method of reducing NOx during combustion of coal within a burner, comprising,
providing a coal substrate comprised of pulverized coal;
mixing an organically complexed nanocatalyst composition with the pulverized coal to form a pulverized coal composition, the nanocatalyst composition comprising,
a plurality of catalyst nanoparticles having a size less than about 1 micron and including at least one type of metal; and
a dispersing agent comprising a plurality of organic molecules, each having at least one functional group capable of bonding to at least one metal atom of the catalyst nanoparticles;
introducing the pulverized coal composition into a coal burner; and
causing or allowing the catalyst nanoparticles to catalyze one or more reactions that reduce the amount of NOx produced during combustion of the coal substrate.

24. A method of reducing NOx during combustion of coal within a burner, comprising,
providing a coal substrate comprised of pulverized coal;
providing an organically complexed nanocatalyst composition, the nanocatalyst composition comprising,
a plurality of catalyst nanoparticles having a size less than about 1 micron and including at least one type of metal; and
a dispersing agent comprising a plurality of organic molecules, each having at least one functional group capable of bonding to at least one metal atom of the catalyst nanoparticles;
injecting the pulverized coal and the organically complexed nanocatalyst composition into a coal burner; and
causing or allowing the catalyst nanoparticles to catalyze one or more reactions that reduce the amount of NOx produced during combustion of the coal substrate.

* * * * *

UNITED STATES PATENT AND TRADEMARK OFFICE
CERTIFICATE OF CORRECTION

PATENT NO. : 7,357,903 B2  Page 1 of 1
APPLICATION NO. : 11/129833
DATED : April 15, 2008
INVENTOR(S) : Zhou et al.

It is certified that error appears in the above-identified patent and that said Letters Patent is hereby corrected as shown below:

Column 2
Line 61, change "iron nana-" to --nano- --

Column 3
Line 5, change "nanacatalyst" to --nanocatalyst--
Line 11, change "nanacatalyst" to --nanocatalyst--
Line 60, change "mn" to --nm--

Column 4
Line 67, change "hetoratoms" to --heteroatoms--

Column 10
Line 37, change "or" to --or the like.--

Column 12
Line 49, change "in-" to --in--

Column 24
Line 37, change "furnance" to --furnace--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,357,903 B2  Page 1 of 1
APPLICATION NO. : 11/129833
DATED : April 15, 2008
INVENTOR(S) : Zhou et al.

It is certified that error appears in the above-identified patent and that said Letters Patent is hereby corrected as shown below:

Column 2
Line 61, change "iron nana-" to --nano- --

Column 3
Line 5, change "nanacatalyst" to --nanocatalyst--
Line 11, change "nanacatalyst" to --nanocatalyst--
Line 60, change "mn" to --nm--

Column 4
Line 67, change "hetoratoms" to --heteroatoms--

Column 10
Line 37, change "or" to --or the like.--

Column 12
Line 49, change "in-" to --in--

Column 24
Line 37, change "furnance" to --furnace--

Signed and Sealed this

Thirtieth Day of September, 2008

JON W. DUDAS
*Director of the United States Patent and Trademark Office*